US006886007B2

United States Patent
Leymann et al.

(10) Patent No.: US 6,886,007 B2
(45) Date of Patent: Apr. 26, 2005

(54) TAXONOMY GENERATION SUPPORT FOR WORKFLOW MANAGEMENT SYSTEMS

(75) Inventors: Frank Leymann, Aidlingen (DE); Dieter Roller, Schoensich (DE)

(73) Assignee: International Business Machines Corporation, Armonk, NY (US)

(*) Notice: Subject to any disclaimer, the term of this patent is extended or adjusted under 35 U.S.C. 154(b) by 568 days.

(21) Appl. No.: 09/938,403

(22) Filed: Aug. 24, 2001

(65) Prior Publication Data

US 2002/0026297 A1 Feb. 28, 2002

(30) Foreign Application Priority Data

Aug. 25, 2000 (EP) .......................................... 00118462

(51) Int. Cl.[7] .............................................. G06F 17/30
(52) U.S. Cl. ...................... 707/3; 707/102; 707/104.1
(58) Field of Search .............................. 707/1–3, 100, 707/102, 104.1

(56) References Cited

U.S. PATENT DOCUMENTS

| | | | | |
|---|---|---|---|---|
| 5,937,388 A | * | 8/1999 | Davis et al. .................... | 705/8 |
| 6,009,405 A | * | 12/1999 | Leymann et al. .............. | 705/9 |
| 6,377,937 B1 | * | 4/2002 | Paskowitz ..................... | 705/26 |
| 6,408,321 B1 | * | 6/2002 | Platt ............................. | 708/520 |
| 6,631,354 B1 | * | 10/2003 | Leymann et al. .............. | 705/8 |
| 6,711,585 B1 | * | 3/2004 | Copperman et al. ..... | 707/104.1 |

* cited by examiner

Primary Examiner—Greta Robinson
Assistant Examiner—Debbie M. Le
(74) Attorney, Agent, or Firm—William A. Kinnaman, Jr.; Lawrence D. Cutter (57) ABSTRACT

A method and means for automatically deriving from a process model of a workflow management system (WFMS) or a computer system with comparable functionality a set of underlying application services and providing a means to locate these application services by creating entries in appropriate taxonomies. The computerized method provides access to an application service by the following steps: a first step of analyzing a process model, defining an execution path through said process model as an application service, and creating an application service description document for the path by retrieving and aggregating for elements of the execution path associated element specifications from the process model; a second step of calculating for the application service description document a highest matching degree with a category in a taxonomy scheme; and a third step of assigning an access reference to the application service to said category with said highest matching degree for enabling a user to navigate within said taxonomy scheme and to provide access to said application service by selecting said application services access reference. The invention be used to enhance an existing taxonomy scheme with new access references to application services or used by itself to create a taxonomy scheme.

21 Claims, 5 Drawing Sheets

FIG. 1

FIG. 2 boat
    order
    price
    repair car
    order
    price
    repair financing
    consumer goods shipping

FIG. 3A boat
    order
        http://www.boat.de/order  ———— 300
    price
        http://www.boat.de/price  ———— 305
    repair car
    order  ———— 310
        http://www.car.de/order
    price  ———— 315
        http://www.car.de/price
    repair financing  ———— 320
    consumer goods
        http://www.bank.de/consumer goods     ———— 325
shipping
    http://www.shipping.de/Request

FIG. 3B boat — 400
  buy
    http:::/www.fullservice.de/boat — 405
  order
    http://www.boat.de/order
  price
    http://www.boat.de/price
  repair — 410 car — 415
  buy
    http://www.fullservice.de/car
  order
    http://www.car.de/order
  price
    http://www.car.de/price
  repair financing
  consumer goods
    http://www.bank.de/consumer goods shipping
  http://www.shipping.de/Request

FIG.4

```
boat
    buy
        http:://www.fullservice.de/boat
    order
        http://www.boat.de/order
            see also boat\buy\http://www.fullservice.de/boat —————500
    price
        http://www.boat.de/price
            see also boat\buy\http://www.fullservice.de/boat —————505
    repair car
    buy
        http://www.fullservice.de/car
    order
        http://www.car.de/order
            see also car\buy\http://www.fullservice.de/car ————510
    price
        http://www.car.de/price
            see also car\buy\http://www.fullservice.de/car —————515
    repair financing
    consumer goods
        http://www.bank.de/consumer goods           ————520
            see also boat\buy\http://www.fullservice.de/boat
            see also car\buy\http://www.fullservice.de/car   ————525 shipping
    http://www.shipping.de/Request
        see also boat\buy\http://www.fullservice.de/boat  ————530
        see also car\buy\http://www.fullservice.de/car    ————535
```

TAXONOMY GENERATION SUPPORT FOR WORKFLOW MANAGEMENT SYSTEMS

BACKGROUND OF THE INVENTION

1. Field of the Invention

The present invention relates to a method and means for automatically deriving from a process model of a workflow management system (WFMS) or a computer system with comparable functionality a set of underlying application services and providing a means to locate these application services by creating entries in appropriate taxonomies.

2. Description of the Related Art

A new area of technology with increasing importance is the domain of workflow management systems (WFMSs). WFMSs support the modeling and execution of business processes. Business processes executed within a WFMS environment control which piece of work of a network of pieces of work will be performed by whom and which resources are exploited for this work. The individual pieces of work might be distributed across a multitude of different computer systems connected by some type of network.

The product IBM MQSeries Workflow (previously called IBM FlowMark) represents such a typical modern, sophisticated, and powerful workflow management system. It supports the modeling of business processes as a network of activities. This network of activities, the process model, is constructed as a directed, acyclic, weighted, colored graph. The nodes of the graph represent the activities which are performed. The edges of the graph, the control connectors, describe the potential sequence of execution of the activities. Definition of the process graph is via IBM MQSeries Workflow's Flow Definition Language (FDL) or via the built-in graphical editor. The runtime component of the workflow management system interprets the process graph and distributes the execution of activities to the right person at the right place, e.g. by assigning tasks in the form of work items to one or more wordlists associated with the respective person, wherein said wordlists and work items are stored as digital data within said workflow or process management system.

When companies start to exploit workflow technology to a larger extent, more and more application services are built as workflow-based applications. Note that workflow-based applications consist of a process model and activity implementations. Quite often new application services are constructed by scripting together existing application services/business processes. These new business processes are then typically higher-value business processes. With an increasing number of business processes, it is imperative that means are provided that help the users to easily find the business process that solves their business problem. This is normally achieved by organizing/categorizing the business processes into a particular taxonomy.

Placing the individual application services/business processes into a taxonomy is typically done manually. This approach has several disadvantages: (1) the task itself is time-consuming, (2) the skills needed and (3) if done by different people, the results are lacking consistency. Thus a technology is required that provides for the automatic generation of the appropriate taxonomy entries or even the generation of an appropriate taxonomy.

Moreover from a large process model it might be not clear, due its complexity, which elementary application services it actually provides.

Figure 2:
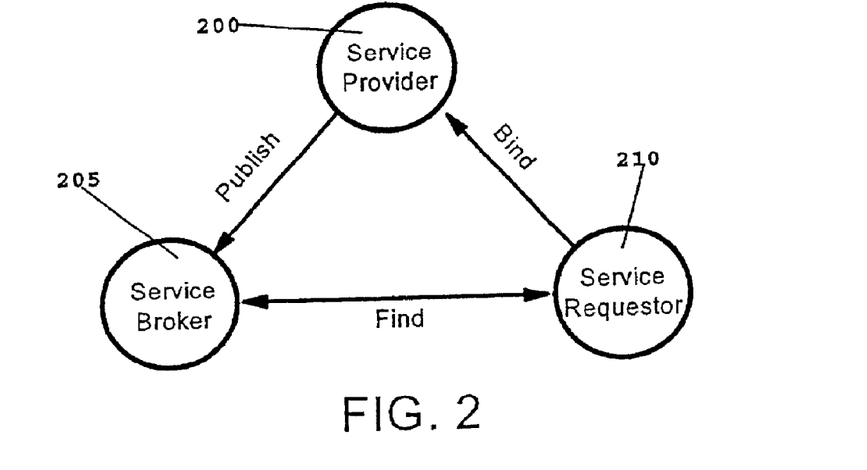
FIG. 2 shows the players of the service-centric Web to which the Web will evolve to from a document-centric Web.

The same problem is further increased by the rapid evolution of Internet technology in the direction of business-to-business (B2B) and customer-to-business (C2B) interaction scenarios. These latter moves in the industry will change the Web from content-centric to service-centric. FIG. 2 shows the players in the new service-centric Web. Companies no longer just publish documents, but offer their application services on the web and allow requesters to invoke those services directly; they are becoming Service Providers (200). There will be a hierarchy of service providers; some of them will offer services that are composed of services by other service providers. The "scripting together" of the individual services into higher-level services can be done by using a WFMS. The service requesters (210) themselves are no longer just the typical home/office users, but companies that need services; they "Bind" themselves to the service providers by calling application services. In this situation, Service Brokers (205) of the future are even more important than the content brokers in the content-centric web as of today. The quality of query results is crucial to the success of service brokers and service providers. The quality of queries depends on the quality of the taxonomies and the amount of population of the hierarchy with elementary application service offerings that the service brokers provide. The service brokers are adding value by collecting the information on available application services "Published" by a multitude of service providers and integrate these application services as a single point of access (similar to a "Web Portal" according to the content-centric web as of today). As visualized within FIG. 2 the service requesters will search the service brokers offerings to "Find" a reference to an appropriate application service, which finally will be exploited for accessing that particular application service by "Binding" to the service provider. In today's document-centric Web taxonomization is mostly done manually; an approach that seems to work at the moment. A manual approach for generating taxonomies for application services however not only suffers the disadvantages mentioned earlier (skills, consistency, effort) but these disadvantages are further aggravated by the fact that not only the number of application services is greater by orders of magnitude but that also the breadth and depth of required skill is significantly higher. Thus only an automatic method of generating taxonomies is feasible to solve these difficulties.

SUMMARY OF THE INVENTION

The invention is based on the objective to supply a technology which allows one to automatically derive from a process model of a workflow management system or a computer system with comparable functionality (WFMS) a set of underlying application services and to provide a means to access these application services.

It is a further objective of the current invention to provide a teaching for automatically deriving from a process model a taxonomy scheme of application services.

The objectives of the invention are solved by the independent claims. Further advantageous arrangements and embodiments of the invention are set forth in the respective subclaims.

The computerized method provides access to an application service by the following steps:

a first step of analyzing a process model, defining an execution path through said process model as an application service, and creating an application service description document for the path by retrieving and aggregating for elements of the execution path associated element specifications from the process model;

a second step of calculating for the application service description document a highest matching degree with a category in a taxonomy scheme, and a third step of assigning an access reference of the application service to said category with said highest matching degree for enabling a user to navigate within said taxonomy scheme and to provide access to said application service by selecting said application services access reference.

Not only can the present invention be used to enhance an existing taxonomy scheme with new access references to application services, but it can also be used by itself to create a taxonomy scheme.

For that purpose instead of above third step the features of said application service description documents are extracted and their corresponding feature vectors are calculated exploiting mining technology. Based on the feature vectors a taxonomy scheme is calculated again exploiting mining technology and each category within the taxonomy scheme is associated with a category vector.

BRIEF DESCRIPTION OF THE DRAWINGS

FIG. 3 (comprising FIGS. 3A–3B) shows a taxonomy that is used to illustrate the placement of the taxonomy entries created from the sample process.

DESCRIPTION OF THE PREFERRED EMBODIMENT

In the drawings and specification there has been set forth a preferred embodiment of the invention and, although specific terms are used, the description thus given uses terminology in a generic and descriptive sense only and not for purposes of limitation.

The present invention can be realized in hardware, software, or a combination of hardware and software. Any kind of computer system or other apparatus adapted for carrying out the methods described herein is suited. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which when loaded in a computer system is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The current invention is illustrated based on IBM's MQSeries Workflow workflow management system. Of course any other WFMS could be used instead. Furthermore the current teaching applies also to any other type of system which offers WFMS functionalities not as a separate WFMS but within some other type of system.

Moreover the notion of a process model as used within this specification does not necessarily mean that the process model has to be executable by a WFMS. To achieve the objectives of the current invention it would suffice if the process model is only a description of business processes without representing some executable entity.

Introduction

The following is a short outline on the basic concepts of a workflow management system based on IBM's MQSeries Workflow WFMS:

From an enterprise point of view the management of business processes is becoming increasingly important: business processes or process for short control which piece of work will be performed by whom and which resources are exploited for this work, i.e. a business process describes how an enterprise will achieve its business goals. A WFMS may support both, the modeling of business processes and their execution.

Modeling of a business process as a syntactical unit in a way that is directly supported by a software system is extremely desirable. Moreover, the software system can also work as an interpreter basically getting as input such a model: The model, called a process model or workflow model, can then be instantiated and the individual sequence of work steps depending on the context of the instantiation of the model can be determined. Such a model of a business process can be perceived as a template for a class of similar processes performed within an enterprise; it is a schema describing all possible execution variants of a particular kind of business process. An instance of such a model and its interpretation represents an individual process, i.e. a concrete, context dependent execution of a variant prescribed by the model. A WFMSs facilitates the management of business processes. It provides a means to describe models of business processes (build time) and it drives business processes based on an associated model (runtime). The meta model of IBM's WFMS MQSeries Workflow, i.e. the syntactical elements provided for describing business process models, and the meaning and interpretation of these syntactical elements, is described next.

A process model is a complete representation of a process, comprising a process diagram and the settings that define the logic behind the components of the diagram. Important components of a MQSeries Workflow process model are:

Processes
Activities
Blocks
Control flows
Connectors
Data containers
Data structures
Conditions Programs Staff.

Not all of these elements will be described below.

Activities are the fundamental elements of the meta model. An activity represents a business action that is from a certain perspective a semantic entity of its own.

An MQSeries Workflow process model consists of the following types of activities:

Program activity: Has a program assigned to perform it. The program is invoked when the activity is started. In a fully automated workflow, the program performs the activity without human intervention. Otherwise, the user must start the activity by selecting it from a runtime work list. Output from the program can be used in the exit condition for the program activity and for the transition conditions to other activities.

Process activity: Has a (sub-)process assigned to perform it. It is modeled as a subprocess model. The process is invoked when the activity is started. A process activity represents a way to reuse a set of activities that are common to different processes. Output from the process, can be used in the exit condition for the process activity and for the transition conditions to other activities.

The flow of control, i.e. the control flow through a running process determines the sequence in which activities are executed. The MQSeries Workflow workflow manager navigates a path through the process that is determined by the evaluation to TRUE of start conditions, exit conditions, and transition conditions.

Connectors link activities in a process model. Using connectors, one defines the sequence of activities and the transmission of data between activities. Since activities might not be executed arbitrarily they are bound together via control connectors. A control connector might be perceived as a directed edge between two activities; the activity at the connector's end point cannot start before the activity at the start point of the connector has finished (successfully). Control connectors model thus the potential flow of control within a business process model. Default connectors specify where control should flow when the transition condition of no other control connector leaving an activity evaluates to TRUE. Default connectors enable the workflow model to cope with exceptional events. Data connectors specify the flow of data in a workflow model. A data connector originates from an activity or a block, and has an activity or a block as its target. One can specify that output data is to go to one target or to multiple targets. A target can have more than one incoming data connector.

Process definition includes modeling of activities, control connectors between the activities, input/output container, and data connectors. A process is represented as a directed acyclic graph with the activities as nodes and the control/data connectors as the edges of the graph. The graph is manipulated via a built-in graphic editor. The data containers are specified as named data structures. These data structures themselves are specified via the DataStructureDefinition facility. Program activities are implemented through programs. The programs are registered via the Program Definition facility. Blocks contain the same constructs as processes, such as activities, control connectors etc. They are however not named and have their own exit condition. If the exit condition is not met, the block is started again. The block thus implements a Do Until construct. Process activities are implemented as processes. These subprocesses are defined separately as regular, named processes with all its usual properties. Process activities offer great flexibility for process definition. It not only allows one to construct a process through permanent refinement of activities into program and process activities (top-down), but also to build a process out of a set of existing processes (bottom-up).

All programs which implement program activities are defined via the Program Registration Facility. Registered for each program is the name of the program, its location, and the invocation string. The invocation string consists of the program name and the command string passed to the program.

Information Mining Technology

To solve above mentioned problem the current invention exploits in a the specific way the so called information mining technology. Information mining is the process of data mining and/or text mining. It uses advanced technology for gleaning valuable insights from these sources that enable the business user making the right business decisions and thus obtaining the competitive advantages required to thrive in today's competitive environment. Information Mining in general generates previously unknown, comprehensible, and actionable information from any source, including transactions, database contents, documents, e-mail, web pages, and other, and using it to make crucial business decisions.

Data is the raw material. It can be a set of discrete facts about events, and in that case, it is most usefully described as structured records of transactions, and it is usually of numeric or literal type. But documents and Web pages are also a source of an unstructured data, delivered as a stream of bits which can be decoded as words and sentences of text in a certain language.

Data mining takes advantage of the infrastructure of stored data, e.g., labels and relationships) to extract additional useful information. For example, by data mining a customer data base, one might discover everyone who buys product A also buys products B and C, but six month later. Further investigation would show if this is a necessary progression or a delay caused by inadequate information. In that case, marketing techniques can be applied to educate customers and shorten the sales cycle.

Text mining is the application of the idea of data mining to non-structured or less structured text files. Data mining permits the owner or user of the data to gain new insights and knowledge by finding patterns in the data which would not be recognizable using traditional data query and reporting techniques. These techniques permit comparisons to be made across data from many sources of differing types, extracting information that might not be obvious or even visible to the user, and organize documents and information by their subjects or themes. Text mining compared to data mining must operate in a less structured world. Documents rarely have strong internal infrastructure (and where they do, it is frequently focused on document format rather than document content). In text mining, meta data about documents is extracted from the document and stored in a data base where it may be "mined" using data base and data mining techniques. The meta data serves as a way to enrich the content of the document, not just on its own, but by the ways the mining software can then manipulate it. The text mining technique is a way to extend data mining methodologies to the immense and expanding volumes of stored text by an automated process that creates structured data describing documents.

In essence, information mining is distinguished by the fact that it is aimed at the discovery of information and knowledge, without a previously formulated hypothesis. By definition, the information discovered through the mining process must have been previously unknown, that is, it is unlikely that the information could have been hypothesized in advance. For structured data, the interchangeable terms "data mining" and "knowledge discovery in databases" describe a multidisciplinary field of research that include machine learning, statistics, database technology, rule based systems, neural networks, and visualization. "Text mining" technology is also based on different approaches of the same technologies; moreover it exploits techniques of computational linguistics.

Further details of the information mining technology is illustrated on the basis of IBM's information mining products IBM Intelligent Miner for Data and IBM Intelligent Miner for Text.

Feature Extraction

Many of the technologies and tools developed in information mining are dedicated to the task of discovery and extraction of information or knowledge from text documents, called feature extraction. The basic pieces of information in text, such as the language of the text or company names or dates mentioned, are called features. Information extraction from unconstrained text is the extraction of the linguistic items that provide representative or otherwise relevant information about the document content. These features are used to assign documents to categories in a given scheme, group documents by subject, focus on specific parts of information within documents, or improve the quality of information retrieval systems. The extracted features can also serve as meta data about the analyzed documents.

The feature extraction component of the Intelligent Miner for Text recognizes significant vocabulary items in text. The process is fully automatic—the vocabulary is not predefined. When analyzing single documents, the feature extractor can operate in two possible modes. In the first, it analyzes that document alone. In the preferred mode, it locates vocabulary in the document which occurs in a dictionary which it has previously built automatically from a collection of similar documents. When using a collection of documents, the feature extractor is able to aggregate the evidence from many documents to find the optimal vocabulary. For example, it can often detect the fact that several different items are really variants of the same feature, in which case it picks one as the canonical form.

In addition, it can then assign a statistical significance measure to each vocabulary item. The significance measure, called "Information Quotient" (IQ), is a number which is assigned to every vocabulary item/feature found in the collection; e.g. features that occur more frequently within a single document than within the whole document collection are rated high. The calculation of IQ uses a combination of statistical measures which together measure the significance of a word, phrase or name within the documents in the collection.

Clustering

A further technology of major importance in information mining is dedicated to the task of clustering of documents. Within a collection of objects a cluster could be defined as a group of objects whose members are more similar to each other than to the members of any other group. In information mining clustering is used to segment a document collection into subsets, the clusters, with the members of each cluster being similar with respect to certain interesting features. For clustering no predefined taxonomy or classification schemes are necessary. This automatic analysis of information can be used for several different purposes: (1) to provide an overview of the contents of a large document collection; (2) to identify hidden structures between groups of objects e.g. clustering allows that related documents are all connected by hyper links; (3) to ease the process of browsing to find similar or related information e.g. to get an overview over documents; and (4) to detect duplicate and almost identical documents in an archive.

Typically, the goal of cluster analysis is to determine a set of clusters, or a clustering, in which the inter-cluster similarity is minimized and intra-cluster similarity is maximized. A number of different algorithms have been proposed that are more or less appropriate for different data collections and interests. Hierarchical clustering works especially well for textual data. In contrast to flat or linear clustering where the clusters have no genuine relationship, the clusters in a hierarchical approach are arranged in a clustering tree where related clusters occur in the same branch of the tree. Clustering algorithms have a long tradition. Examples and overviews of clustering algorithms may be found in M. Iwayama, T. Tokunaga, "Cluster-Based Text Categorization: A Comparison of Category Search Strategies", in: Proceedings of SIGIR 1995, pp. 273–280, July 1995, ACM.

It is clear that the notion of similarity between documents and clusters is crucial. A very simple similarity measure would be the degree of overlap for single words in the documents.

Instead of taking this approach, the clustering tool uses lexical affinities instead of single words. A lexical affinity is a correlated group of words which appear frequently within a short distance of one another. Lexical affinities include phrases like "online library" or "computer hardware" as well as other less readable word groupings. They are generated dynamically, thus they are specific for each collection. A set of semantically rich terms can be obtained without a need to hand-code a specialized lexicon or a thesaurus. The clustering tool uses a list of the lexical affinities in each document as the basis for its similarity calculation. A cluster can be labeled with the lexical affinities it contains, which allows a user to quickly assess the characteristics of the cluster.

Of course instead of a lexical affinity based feature extraction methodology for similarity calculation any other feature extraction methodology (for instance linguistic feature extraction) may be used.

Categorization

A further technology of major importance in information mining is dedicated to the task of categorization of documents. In general, to categorize objects means to assign them to predefined categories or classes from a taxonomy. The categories may be overlapping or distinct, depending on the domain of interest. For information mining, categorization can mean to assign categories to documents or to organize documents with respect to a predefined organization. Categorization in the context of information mining means to assign documents to preexisting categories sometimes called topics or themes. The categories are chosen to match the intended use of the collection and have to be trained beforehand. By assigning documents to categories, information mining can help to organize them. While categorization cannot replace the kind of cataloging a librarian does, it provides a much less expensive alternative.

The categorization tool assigns documents to predefined categories. For this purpose the categorization tool first has to be trained with a training set consisting of a collection of sample documents for each category. These collections are used to create a category scheme or taxonomy scheme. The training uses the feature extraction tool in order to store only relevant information in the dictionary. The category scheme is a dictionary which encodes in a condensed form significant vocabulary statistics for each category. These statistics are used by categorization tool to determine the category or categories whose sample documents are closest to the documents at hand. The purpose of the categorization algorithm is to return a ranked list of categories for a given piece of text, called query document. The rank value is a sum over the number of occurrences of all the different vocabulary items (i.e. canonical forms or their variants) in the query document. Each number of occurrences is weighted by a term that takes into account the relative frequency of the vocabulary item in the category itself in proportion to its relative frequency in the whole training set. Thus a word with a high frequency in a single category and a comparatively low frequency in the whole training set will have a higher weight than a word that occurs very frequently in the training set or a word that occurs less frequently in the category. Thus for each category a rank value will be calculated with respect to the vocabulary of the query document. The output of the categorization tool is a text document that lists each input document together with its highest ranked categories. The number of the returned categories can be specified by the user. The rank value is returned as well and can be used for further processing.

The categorization approach may be based on any feature extraction algorithm.

Analyzing Process Models with Information Mining

Figure 1:
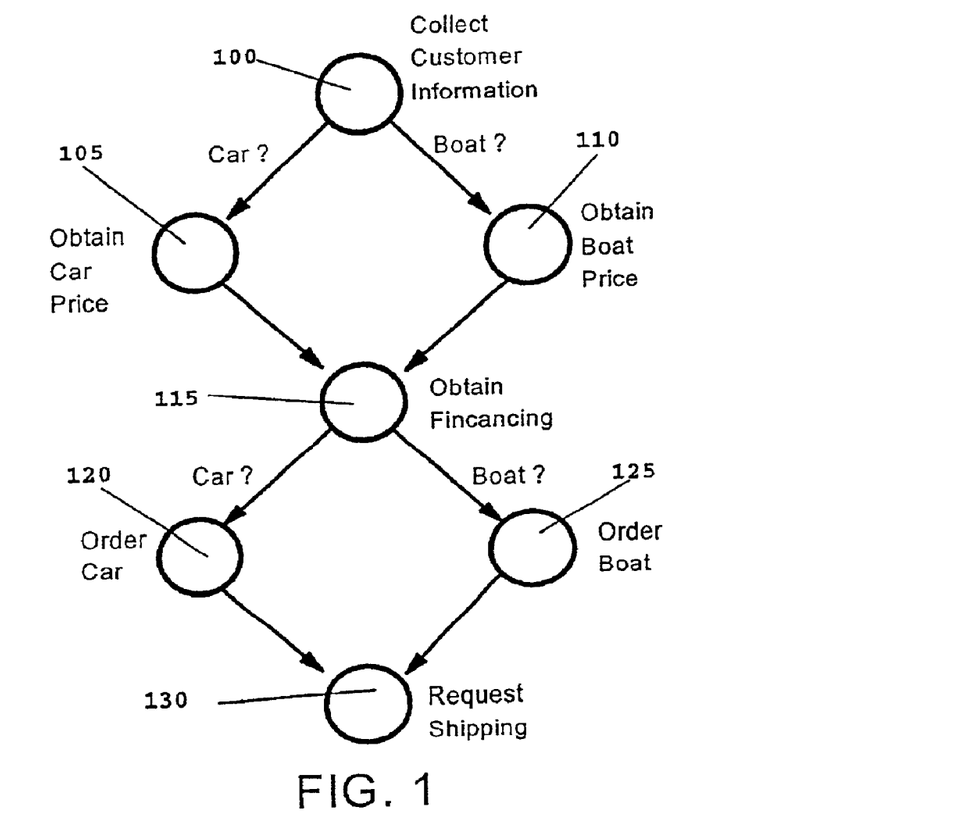
FIG. 1 shows the structure of a process model that is used to illustrate the outlined method.

The process model shown in FIG. 1 is used to illustrate the proposed method. The process model is for a business process that carries out for a customer all functions that are necessary to purchase a car or a boat including the financing of the car/boat and shipment of the car/boat to the customer. It is assumed that this process is provided by a service broker.

The name of the process model is Full Service Buying. Some of the steps, i.e. activities, are handled by programs that are invoked when the business process is carried out and of course some of the steps can also be handled by processes carried out by other parties. Referring to FIG. 1 the individual steps are the collection of the customer information including the customer's address and selection (100), the obtaining of car/boat information (including prices information (105,110), obtaining appropriate financing (115), ordering the car/boat (120,125) and shipping of the car/boat (130).

The process model and the individual activities are associated with a textual (typically) description that portrays the purpose of the process as well as the individual activities. If an activity is implemented via another process, then the description of this other process may be available as well. These descriptions, in the following also called specifications or documents, are the starting point for generating appropriate taxonomy entries. The current invention suggests to apply mining technology to these descriptions.

FIG. 1 is an oversimplification compared to a real-world situation introduced only for improved intelligibility. A process model typically has a multitude of ways it can be carried out. This execution history depends on the actual context in which a particular process is being carried out. A fundamental observation according to the current teaching is, that execution paths within a process model can be interpreted as an individual ("elementary") application service. In this respect either a complete execution path, starting at an entry point and ending at an exit point of said process model, or any segment of such a complete execution path can be interpreted as application service. The process model in FIG. 1 can be carried out in two different ways, that is along 2 possible execution paths, depending upon whether the customer wants to get a car or a boat. In the case of a car, a first execution path comprising the activities Collect Customer Information (100), Obtain Car Price (105), Obtain Financing (115), Order Car (120), and Request Shipping (130) are carried out, in the case of a boat however of a second execution path comprising the activities Collect Customer Information (100), Obtain Boat Price (110), Obtain Financing (115), Order Boat (125), and Request Shipping (130) are executed.

Figure 6:
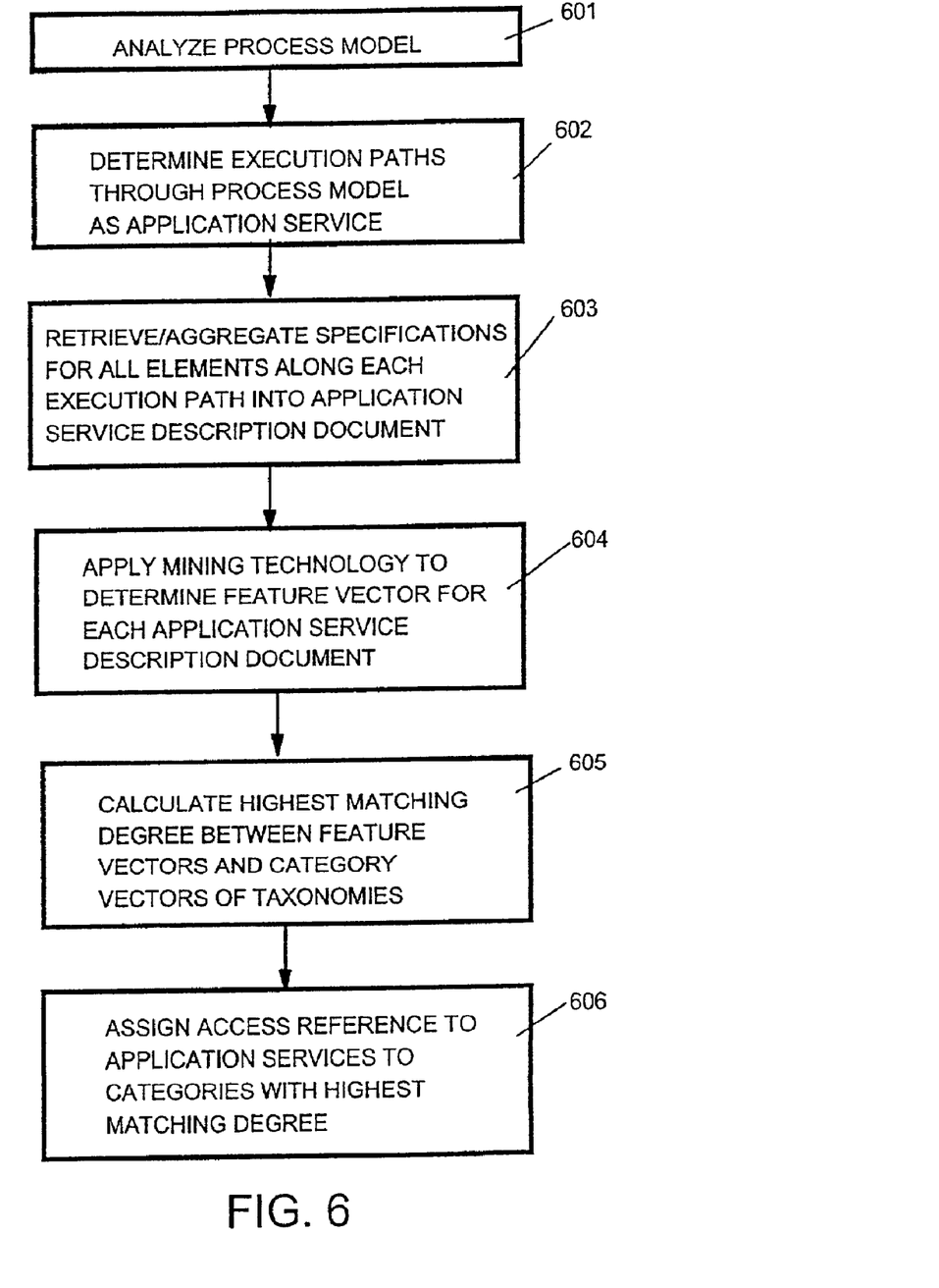
FIG. 6 is a flow chart depicting a global view on the methodology according to the current invention.

Referring to FIG. 6 a global view on the methodology according to the current invention will be described next.

Within a first step the process models will be analyzed 601. All execution paths through the process model are determined and identified 602 for the further processing as application services. Identification of an application service my even comprise that certain parameters are preset to certain values for example within the input containers; such values may guarantee that certain paths within the process mode are selected at run time by the workflow engine. Within 603 the descriptions (that is the specifications comprised or pointed to by the process model) of the individual elements within the process model for each of the execution sequences are assembled into an application service description document.

It is pointed out that specifications of all available elements within the process model can be exploited for this purpose. The most important examples of such elements are: specifications relating to process activities, specifications relating to transition conditions controlling transitions from a first activity to a second activity, specifications of input containers and/or output containers being part of said execution path, specifications of process activities being modeled as subprocess models. Further elements of a process model are described above.

When applied to the process model of the example of FIG. 1, two application service documents are generated, one for the execution path of buying a car and one for the execution path of buying a boat.

In a second step mining technology is applied to every application service description document. In 604 all the features in the application service description documents are extracted and a corresponding feature vector is computed. Then each feature vector is compared to the category vectors of categories in the taxonomy scheme. This allows in step 605 to evaluate for each feature vector the category with the highest matching degree.

Finally within a third step 606 access references for each determined application service to the category with the highest matching degree are assigned. If a user is navigating within the taxonomy scheme these access references provide access to the corresponding application services. A user is only required to select any of these application services access reference, which will result in an execution of the corresponding application service.

When applied to the process model of the example of FIG. 1 two application service documents, for each of the two execution paths, are then processed by the appropriate mining algorithm to determine their position in a given taxonomy.

Figure 3A:
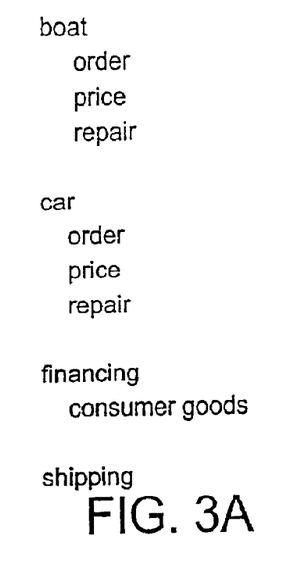
FIG. 3A reflects the mere taxonomy scheme without an integrated application service, while FIG. 3B already comprises certain access references to application services.
Figure 3B:
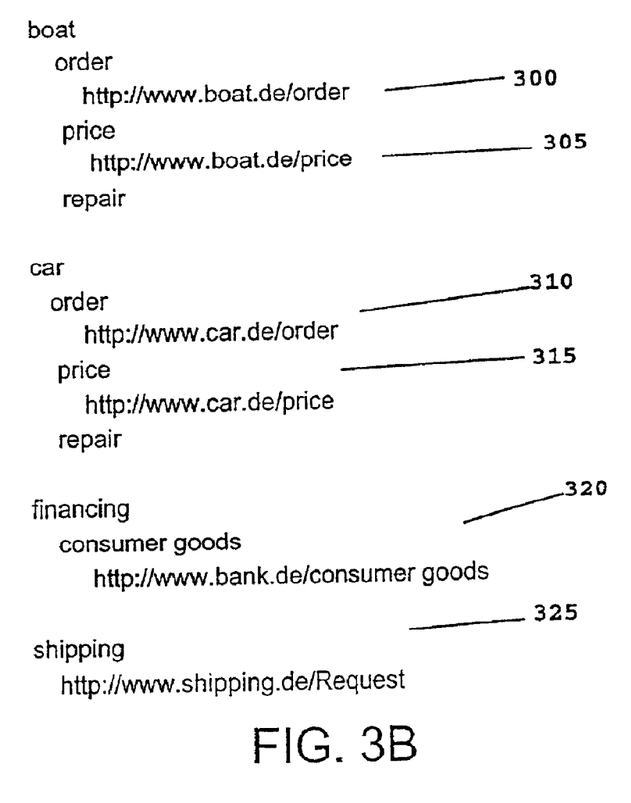

As a starting point it is assumed that a taxonomy as shown in FIG. 3A is given. The taxonomy is empty with respect to application services. As an example it comprises for instance a subtree represented by the category "Boat", comprising the further the categories "Order", "Price", "Repair". Such a taxonomy scheme can be predefined or may be generated by a further embodiment of the current invention as described below. FIG. 3B continues the example of FIG. 3A by already comprising certain access references to application services.

FIG. 3B contains a set of entries that relate to application services which for instance are offered by other companies. The primary purpose of FIG. 3B is to show a potential implementation example of access references to application services. In this example the individual application services are identified via an URL known from Internet technology, which for example would allow someone to go directly to the service provider by for example double-clicking on the URL. Other options for implementing access references could be a SOAP message as defined by Microsoft, IBM and other companies as a method for invoking services via the HTTP protocol. (SOAP, Simple Object Access Protocol: Remote objects can give a program almost unlimited power over the Internet, but most firewalls block non-HTTP requests. SOAP, an XML-based protocol, gets around this limitation to provide intraprocess communication across machines.) Additional information, such as the name of the service provider, could be added. For example, the "boat" and "car" price is obtained by invoking an appropriate URL which is identified in the taxonomy under car\price (315) and under boat\price (305). Similar entries are for ordering a car under car\order (300), for ordering a boat under boat\order (310), for financing any consumer goods under financing\consumer goods (320), for shipping (325).

Figure 4:
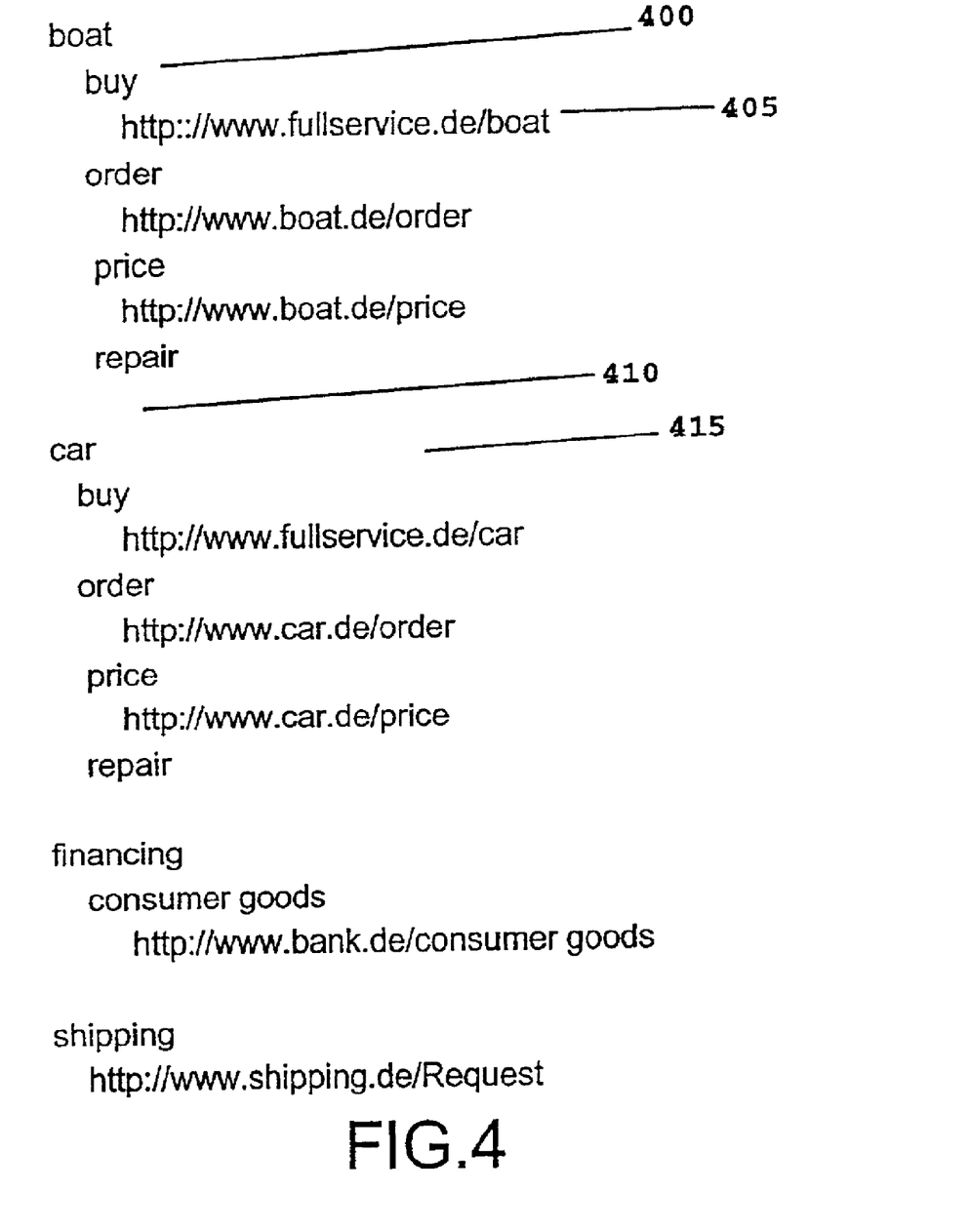
FIG. 4 continues the example of FIG. 3 by now reflecting also application services as derived from the process model of the example of FIG. 1 according to the current teaching.

The application service documents determined from the example of FIG. 1 are now assigned to a category of the taxonomy scheme in FIG. 3 using a mining algorithm. A mining algorithm can derive from the generated application service documents that the new application services are dealing with buying a car and buying a boat based on the comparison of the feature vectors of the application service description documents with the category vectors of the categories. This results in the creation of an entry in the category "Buy" under the category "Boat" (400) and under the category "Car" (410) and the insertion of the appropriate URLs (405, 415) (representing access references to the two application services) under the new created "Buy" entries as shown in FIG. 4.

Figure 5:
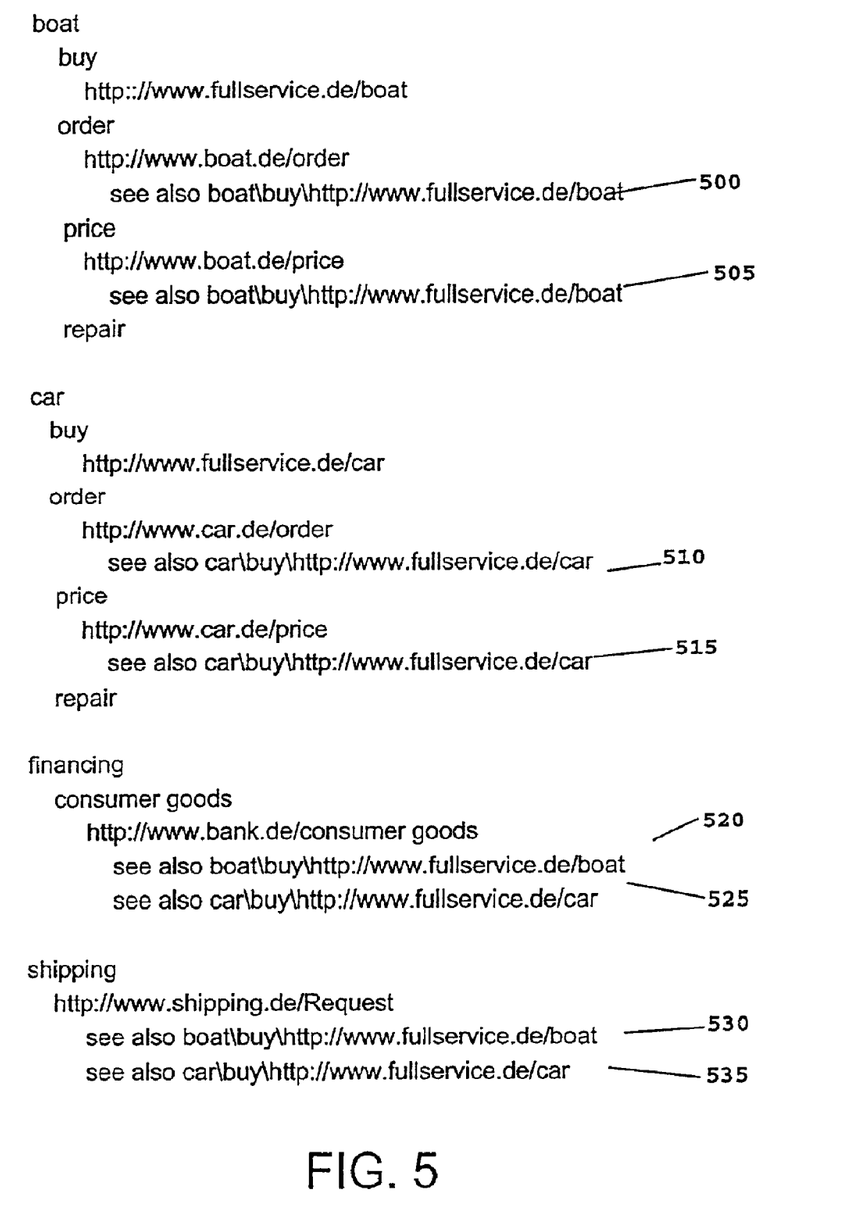
FIG. 5 is continues the example of FIG. 4 by further comprising cross reference indications tagging the individual access references referring to related application services.

As already indicated above a process activity within a certain process model may itself be a subprocess model comprising a network of activities interconnected by control connectors similar to the process model in which it is contained. Referring to FIG. 1 the activities "Obtain Car Price" 105, "Obtain Boat Price" 110, "Obtain Financing" 115, "Order Car" 120, "Order Boat" 125, "Request Shipping" 130 might represent such subprocess models. It is suggested, that when the current invention is applied to a certain process model, to apply the current teaching recursively also to the subprocess models comprised by said process model. If in such a scenario a first application service comprises an activity, which is represented by a subprocess model, a further embodiment of the current invention suggests that application services comprised by said subprocess model are tagged with cross reference indications referring to said first application service in which they are included and vice versa. This would allow users to figure out whether they can obtain some higher value application service by the "Including" application services. FIG. 5 shows one possibility how that could look like. The following examples are reflected within FIG. 5:

Assuming that the activity "Order Boat" 125 corresponds to a subprocess model, which contributes a further application service with the same name, this would result in a cross reference indication 500 to the including application service of "Buying a boat" as reflected by an execution path within FIG. 1.

Assuming that the activity "Obtain Boat Price" 110 corresponds to a subprocess model, which contributes a further application service with the same name, this would result in a cross reference indication 505 to the including application service of "Buying a boat" as it reflected by an execution path within FIG. 1.

Assuming that the activity "Order Car" 120 corresponds to a subprocess model, which contributes a further application service with the same name, this would result in a cross reference indication 510 to the including application service of "Buying a car" as it reflected by an execution path within FIG. 1.

Assuming that the activity "Obtain Car Price" 105 corresponds to a subprocess model, which contributes a further application service with the same name, this would result in a cross reference indication 515 to the including application service of "Buying a car" as it reflected by an execution path within FIG. 1.

Assuming that the activity "Obtain Financing 115 corresponds to a subprocess model which contributes a further application service with the same name, this would result in a cross reference indication 520, 525 to the including application service of "Buying a car" and "Buying of the Boat" as it reflected by an execution path within FIG. 1.

Assuming that the activity "Request Shipping" 130 corresponds to a subprocess model, which contributes a further application service with the same name, this would result in a cross reference indication 530, 535 to the including application service of "Buying a car" and Buying of the Boat" as it reflected by an execution path within FIG. 1.

As already indicated above the current teaching is not only applicable to enhance an existing taxonomy scheme with new access references to application services but can be applied also to create a taxonomy scheme itself.

According to this further embodiment of the current invention the steps 601 up to 604 within FIG. 6 are identical. In a next step all features of the application service description documents are extracted by exploiting mining technology and the corresponding feature vectors are computed. In a further step a complete taxonomy scheme is calculated based on said feature vectors and each category is associated with a category vector.

In yet another embodiment of the current invention even the execution history of a certain process model may be exploited. Such execution histories are collected in audit trails, which precisely reflect which activities of which process model are executed in which sequence based on which input data. Thus these execution histories allow one to precisely determine the execution frequency of each path within a process model. The execution frequency may be interpreted as a measure of "importance" or "usefulness" of certain paths within a process model. The current invention suggests that access references of application services are assigned to the taxonomy scheme only if the execution frequencies of their corresponding paths are above a certain threshold value. With such an approach only the most important/useful application services are reflected within the taxonomy scheme avoiding that the taxonomy scheme is crowded with access references to application services which are used very seldom only.

What is claimed is:

1. A computerized method of automatically providing access to an application service, said method comprising:
   a first step of analyzing a process model, defining an execution path through said process model as an application service, and creating an application service description document for said execution path by retrieving and aggregating for elements of said execution path associated element specifications from said process model;

a second step of calculating for said application service description document a highest matching degree with a category in a taxonomy scheme; and a third step of assigning an access reference to said application service to said category with said highest matching degree for enabling a user to navigate within said taxonomy scheme and to provide access to said application service by selecting said application services access reference.

2. The method of claim 1 wherein said second step comprises the steps of:

extracting the features of said application service description document and computing a feature vector; and comparing said feature vector to category vectors of categories in said taxonomy scheme and evaluating said category with said highest matching degree.

3. The method of claim 1 wherein said first step comprises the step of retrieving and aggregating into said application service description document specifications of a process activity that is part of said execution path.

4. The method of claim 1 wherein said first step comprises the step of retrieving and aggregating into said application service description document specifications of a transition condition controlling transition from a first activity to a second activity that is part of said execution path.

5. The method of claim 1 wherein said first step comprises the step of retrieving and aggregating into said application service description document specifications of an input container or output container that is part of said execution path.

6. The method of claim 1 wherein said first step comprises the step of retrieving and aggregating into said application service description document specifications of a process activity that is part of said execution path, said process activity being modeled as a subprocess model.

7. The method of claim 1 wherein said method is executed for all execution paths within said process model and access is provided to each execution path as a corresponding application service within said taxonomy scheme.

8. The method of claim 1 wherein, if a certain one of said elements is a process activity which is modeled as a subprocess model, said method is also executed for said subprocess model and access is provided to a further execution path through said subprocess model as a further application service in said taxonomy scheme by a further access reference.

9. The method of claim 8, further comprising:

a fourth step of tagging said further access reference with a cross-reference indication referring to said application service.

10. The method of claim 8, further comprising:

a fourth step of tagging said access reference with a cross-reference indication referring to said further application service.

11. The method of claim 1 wherein an audit trail comprising an execution protocol of said process model is analyzed for the execution frequency of said execution path and wherein said access reference is assigned to said taxonomy scheme only if said execution frequency is above a threshold value.

12. The method of claim 1 wherein said process model is executable by a workflow management system.

13. A computer program product stored on a computer usable medium, comprising computer readable program means for causing a computer to perform the method of claim 1 when said program is run on said computer.

14. A computerized method of automatically generating a taxonomy scheme of application services, said method comprising:

a first step of analyzing one or a multitude of process models, defining a multitude of execution paths through said process model as application services, and creating an application service description document for each of said execution paths by retrieving and aggregating for elements of said execution paths associated element specifications from said process model;

a second step of extracting features of said application service description documents and computing feature vectors for said application service description documents, and a third step of calculating a taxonomy scheme based on said feature vectors and associating each category within said taxonomy scheme with a category vector.

15. The method of claim 14 wherein said first step comprises the step of retrieving and aggregating into said application service description document specifications of a process activity that is part of said execution path.

16. The method of claim 14 wherein said first step comprises the step of retrieving and aggregating into said application service description document specifications of a transition condition controlling transition from a first activity to a second activity that is part of said execution path.

17. The method of claim 14 wherein said first step comprises the step of retrieving and aggregating into said application service description document specifications of an input or output container that is part of said execution path.

18. The method of claim 14 wherein said first step comprises the step of retrieving and aggregating into said application service description document specifications of a process activity that is part of said execution path, said process activity being modeled as a subprocess model.

19. The method of claim 14 wherein said method is executed for all execution paths within said process model.

20. The method of claim 14 wherein, if a certain one of said elements is a process activity which is modeled as a subprocess model, said method is also executed for said subprocess model.

21. A computer program product stored on a computer usable medium, comprising computer readable program means for causing a computer to perform the method of claim 14 when said program is run on said computer.

* * * * *